M. J. FITZGERALD AND J. A. BLANK.
SLED.
APPLICATION FILED MAR. 15, 1921.
1,410,397.
Patented Mar. 21, 1922.
2 SHEETS—SHEET 1.
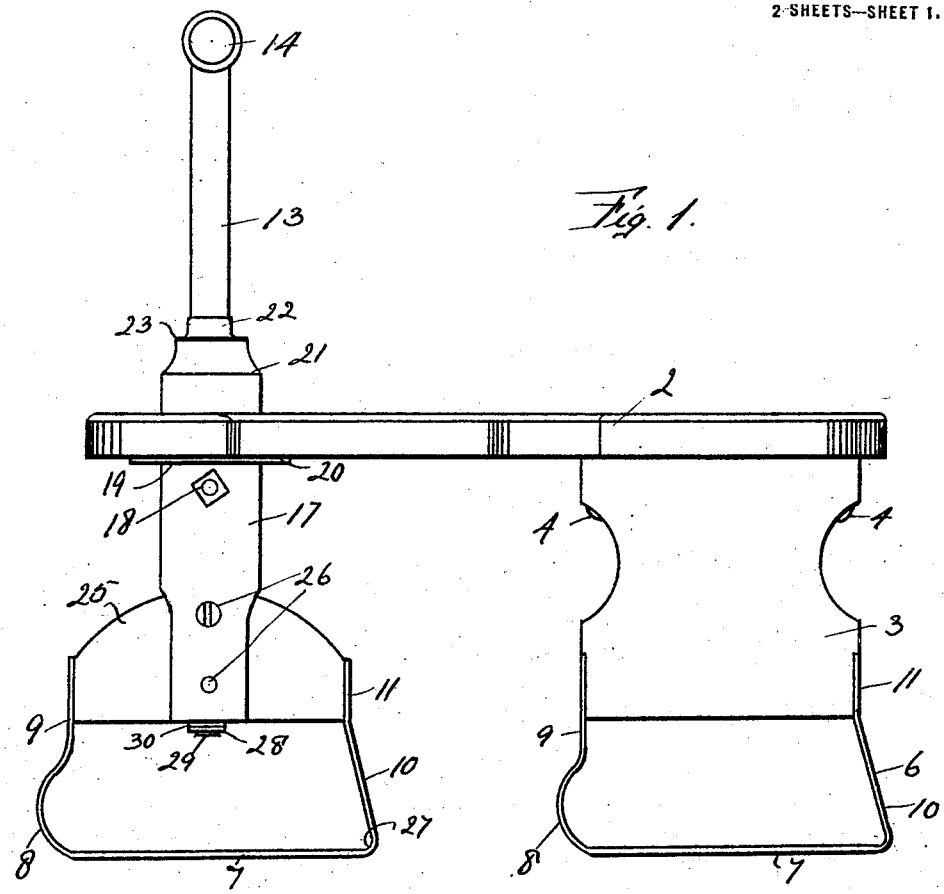
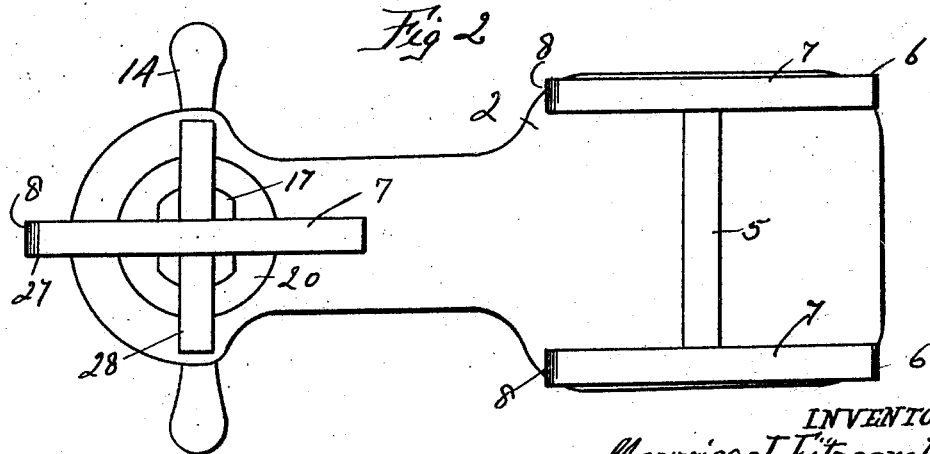
INVENTORS
Maurice J. Fitzgerald
John A. Blank
By W. W. Williamson Atty.

M. J. FITZGERALD AND J. A. BLANK.
SLED.
APPLICATION FILED MAR. 15, 1921.
1,410,397.
Patented Mar. 21, 1922.
2 SHEETS—SHEET 2.
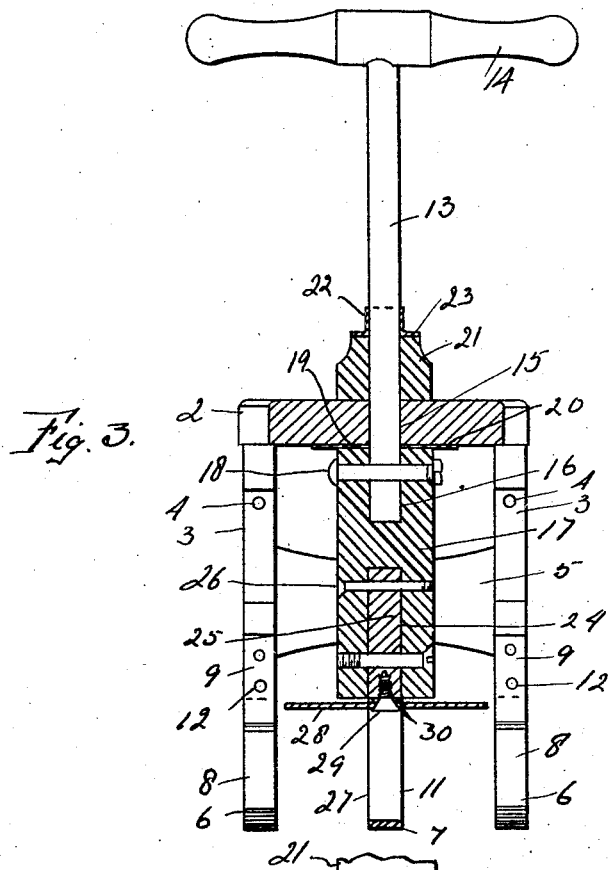
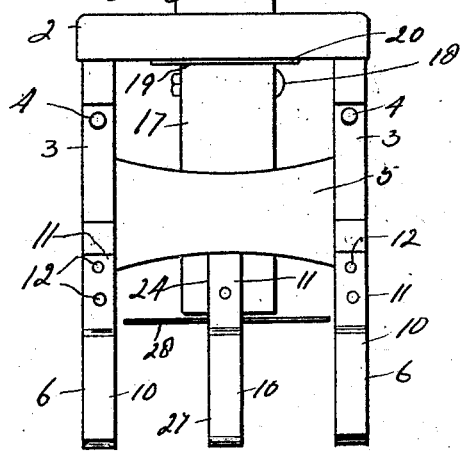
INVENTORS
Maurice J. Fitzgerald
John A. Blank
By W. W. Williamson Atty.

UNITED STATES PATENT OFFICE.

MAURICE J. FITZGERALD AND JOHN A. BLANK, OF PHILADELPHIA, PENNSYLVANIA.

SLED.

1,410,397.   Specification of Letters Patent.   Patented Mar. 21, 1922.

Application filed March 15, 1921. Serial No. 452,521.

*To all whom it may concern:*

Be it known that we, MAURICE J. FITZGERALD and JOHN A. BLANK, citizens of the United States, residing at Philadelphia, in the county of Philadelphia and State of Pennsylvania, have invented new and useful Improvements in a Sled, of which the following is a specification.

Our invention relates to new and useful improvements in a sled, and has for its object to so construct such a device that it may be readily used by a small child and is adapted to be straddled and propelled by the users feet engaging the surface of the snow or ice on which the sled is used.

Another object of this invention is to provide an exceedingly simple and effective construction which will be light in weight in order that it may be readily handled by children of young and tender ages although strong and durable and one that will be relatively inexpensive in the cost of manufacture.

A further object of the invention is to provide a simple and effective means of steering the same, the steering mechanism having a foot rest that may be readily positioned for use and moved into a partially housed position when not in use.

A still further object of the invention is to provide runners of unique construction and having simple compact durable means for connecting said runners with the other elements of the sled.

With these ends in view, this invention consists in the details of construction and combination of elements hereinafter set forth and then specifically designated by the claims.

In order that those skilled in the art to which this invention appertains, may understand how to make and use the same, we will describe its construction in detail, referring by numerals to the accompanying drawings forming a part of this application in which:—

Fig. 1, is a side elevation of our improved sled.

Fig. 2, is a bottom plan view thereof.

Fig. 3, is a vertical sectional view through a portion of the steering post.

Fig. 4, is a rear end view of the sled with a portion of the steering post broken away.

In carrying out our invention as here embodied, 2 represents the seat body having a cutaway portion intermediate its ends whereby the same may be straddled by the user as will be obvious.

To the underside of the seat body at the rear end thereof are secured a pair of spaced parallel longitudinal bolsters 3 one of which is located adjacent each side edge of said seat body and these are fastened to the seat body in any suitable manner as by screws 4. The bolsters are braced or stiffened by a cross piece 5 attached to them in any suitable manner and at some suitable point intermediate their upper and lower ends.

To each of these bolsters is secured a runner 6 preferably formed from a strip of suitable metal, such as steel and comprises a blade or bearing portion 7 and from one end of which projects the arcuate front section 8 having formed therewith the attaching arm 9 which is embedded in the front edge of the bolster 3, while from the rear or opposite end of the bearing portion 7 projects the angular rear section 10 from the upper end of which extends the attaching arm 11 which is embedded in the rear end of the bolster 3. Said runners are fastened to the bolsters in any suitable manner as by screws 12 and when in place the bearing portions 7 are spaced some distance from the bolsters 3 which gives the proper height to the seat body without adding and great weight.

The reference numeral 13 denotes the upper member of the steering post having a handle bar 14 secured to its upper end the lower end of this upper member passes through a hole 15 in the seat body 2 located at the forward end thereof and projects into a recess 16 in the upper end of the lower member 17 of the steering post where it is suitably fastened by a bolt 18 or its equivalent. The lower member 17 of the steering post being of greater diameter than the upper member 13 thereof forms a shoulder 19 which underlies the forward end of the seat body and supports the same and in order to permit easy rotation of the steering post a washer 20 is interposed between the upper end of the lower member and the seat body.

Secured to the upper face of the seat body and surrounding the upper member of the steering post is a collar 21, in which a portion of the steering post rotates and to prevent accidental displacement of the steering post a sleeve 22 is securely fastened to the upper member of the steering post and has a flange 23 resting on top of the collar 21.

The lower end of the lower member 17 of the steering post is bifurcated so as to form a slot 24 in which is mounted the block 25 the same being held in place by screws or their equivalent 26 passing through the arms of the bifurcated end of the lower member, said block or ends of said block projecting beyond the steering post as plainly shown in Fig. 1. To this block 25 is secured a single steering runner 27 formed in the same manner as the runners 6 and including the same elements.

The lower edge of the block 25 is flush with the lower end of the steering post and beneath said block is fastened a foot rest or bar 28 by means of a screw 29 passing therethrough and threaded into the block 25 in order to prevent said foot rest or bar contacting directly with the block 25 or the steering post and a washer 30 is interposed between the foot rest and the block. This foot rest having but a single screw passing therethrough permits the same to be rotated so as to lie parallel that beneath the block or to be swung to a position at right angles thereto as shown in Fig. 3 at which time the same may be used as a foot rest while coasting.

From the foregoing description it will be seen that we have provided a relatively inexpensive sled that is light in weight so as to be readily used by small children and one which may be propelled by the feet of a child using the same without having to assume uncomfortable positions such as resting upon one knee or lying upon the stomach.

Of course we do not wish to be limited to the exact details of construction as herein shown as these may be varied within the limits of the appended claims without departing from the spirit of our invention.

Having fully described our invention, what we claim as new and useful is:—

1. A sled comprising a seat body adapted to be straddled when in use, a pair of parallel blocks secured to the underside of the seat body adjacent its rear end, a brace located between the blocks and secured thereto below the seat body, a runner fastened to each of said blocks, each of said runners consisting of a bearing portion, an arcuate section at the forward end thereof, a finger projecting upwardly from said arcuate section for contacting with one edge of a block, an angular section projecting from the rear end of the bearing portion and a finger projecting upwardly from said angular section and adapted to engage the rear edge of one of said blocks, an upper steering post member passing through the seat body and adjacent its forward end, a collar about said member secured to the upper face of the seat body, a sleeve secured to said member, said sleeve having a flange adapted to rest upon the upper end of the collar, a handle bar secured to the upper end of said member, a lower steering post member of greater diameter than the upper member and having a recess for the reception of said upper member, the difference in diameters of said members forming a shoulder to underlie the seat body, means for securing said members together, a washer interposed between the upper end of the lower steering post member and the seat body, a block carried by the lower end of the lower steering post member and a runner secured to the ends of said block.

2. A sled comprising a seat body adapted to be straddled when in use, a pair of parallel blocks secured to the underside of the seat body adjacent its rear end, a brace located between the blocks and secured thereto below the seat body, a runner fastened to each of said blocks, each of said runners consisting of a bearing portion, an arcuate section at the forward end thereof, a finger projecting upwardly from said arcuate section for contacting with one edge of a block, an angular section projecting from the rear end of the bearing portion and a finger projecting upwardly from said angular section and adapted to engage the rear edge of one of said blocks, an upper steering post member passing through the seat body and adjacent its forward end, a collar about said member secured to the upper face of the seat body, a sleeve secured to said member, said sleeve having a flange adapted to rest upon the upper end of the collar, a handle bar secured to the upper end of said member, a lower steering post member of greater diameter than the upper member and having a recess for the reception of said upper member, the difference in diameters of said members forming a shoulder to underlie the seat body, means for securing said members together, a washer interposed between the upper end of the lower steering post and the seat body, a block secured within a slot in the lower end of the lower steering post member, the lower edge of said block being flush with the lower end of said steering post member, a runner secured to the ends of said block and having a bearing portion spaced from the lower edge of said block, a foot rest bar, a single screw passing through the same into the block for pivotally mounting said foot rest and a washer interposed between said foot rest and said block.

In testimony whereof, we have hereunto affixed our signatures.

MAURICE J. FITZGERALD.
JOHN A. BLANK.